United States Patent [19]

Reynolds et al.

[11] Patent Number: 5,257,473
[45] Date of Patent: Nov. 2, 1993

[54] FISH LINE HOLDER AND BAITING APPARATUS AND PROCESS THEREFOR

[76] Inventors: Albert Reynolds, P.O. Box 19, Caspar, Calif. 95420; Michael W. Wells, 5155 Thomas Dr., Auborn, Calif. 95603

[21] Appl. No.: 904,207

[22] Filed: Jun. 25, 1992

[51] Int. Cl.⁵ .................... A01K 79/00; A01K 97/00
[52] U.S. Cl. .......................... 43/4; 43/4.5; 43/6.5; 43/27.4; 43/57.3
[58] Field of Search ............... 43/27.4, 6.5, 4, 4.5, 43/57.3, 55

[56] References Cited

U.S. PATENT DOCUMENTS

| | | | |
|---|---|---|---|
| Re. 28,380 | 4/1975 | Tison | 43/6.5 |
| 2,531,643 | 11/1950 | Pringle | 43/54.5 |
| 3,029,545 | 4/1962 | Hess et al. | 43/27.4 |
| 3,626,630 | 12/1971 | Tison | 43/6.5 |
| 3,903,632 | 9/1975 | Tison | 43/27.4 |
| 3,945,144 | 3/1976 | Purselley | 43/27.4 |
| 4,015,359 | 4/1977 | Andrews | 43/4 |
| 4,250,648 | 2/1981 | Jacobsen | 43/4 |
| 4,354,323 | 10/1982 | Huff | 43/4 |
| 4,407,088 | 10/1983 | Robertson | 43/27.4 |
| 4,896,449 | 1/1990 | Hopper | 43/4 |
| 4,897,954 | 2/1990 | Gustavsson | 43/27.4 |

FOREIGN PATENT DOCUMENTS

| | | | |
|---|---|---|---|
| 76025 | 12/1949 | Fed. Rep. of Germany | 43/4 |
| 67088 | 11/1957 | France | 43/44.89 |

Primary Examiner—Mark Rosenbaum
Assistant Examiner—Jeanne M. Elpel
Attorney, Agent, or Firm—Flehr, Hohbach, Test, Albritton & Herbert

[57] ABSTRACT

A fish line holder and baiting apparatus stores a common line with fish hooks on a carousel type unit with several arms radiating from a common hub. Each of the arms may carry 150 hooks on a stainless steel rod. The common line is fed into automatic baiting apparatus which is a series of three chambers, a first horizontal hopper, then a vertical hopper and a transition conduit which moves the line via suitable fairleads into the vertical bait hopper. By the use of suitable articulated weights and various fairleads for centering the line, the line can be trolled out behind a moving fishing boat at a relatively high speed with good efficiency in baiting each hook.

18 Claims, 6 Drawing Sheets

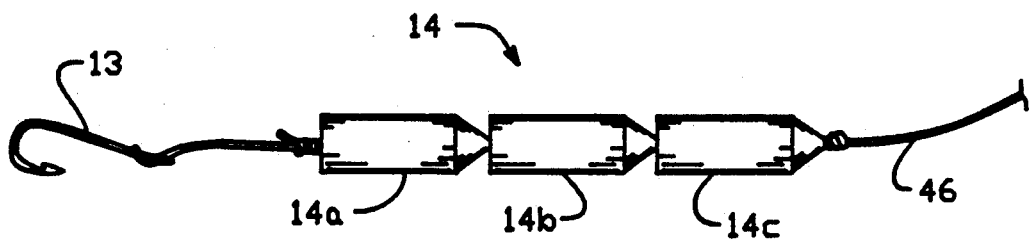
FIG.—4
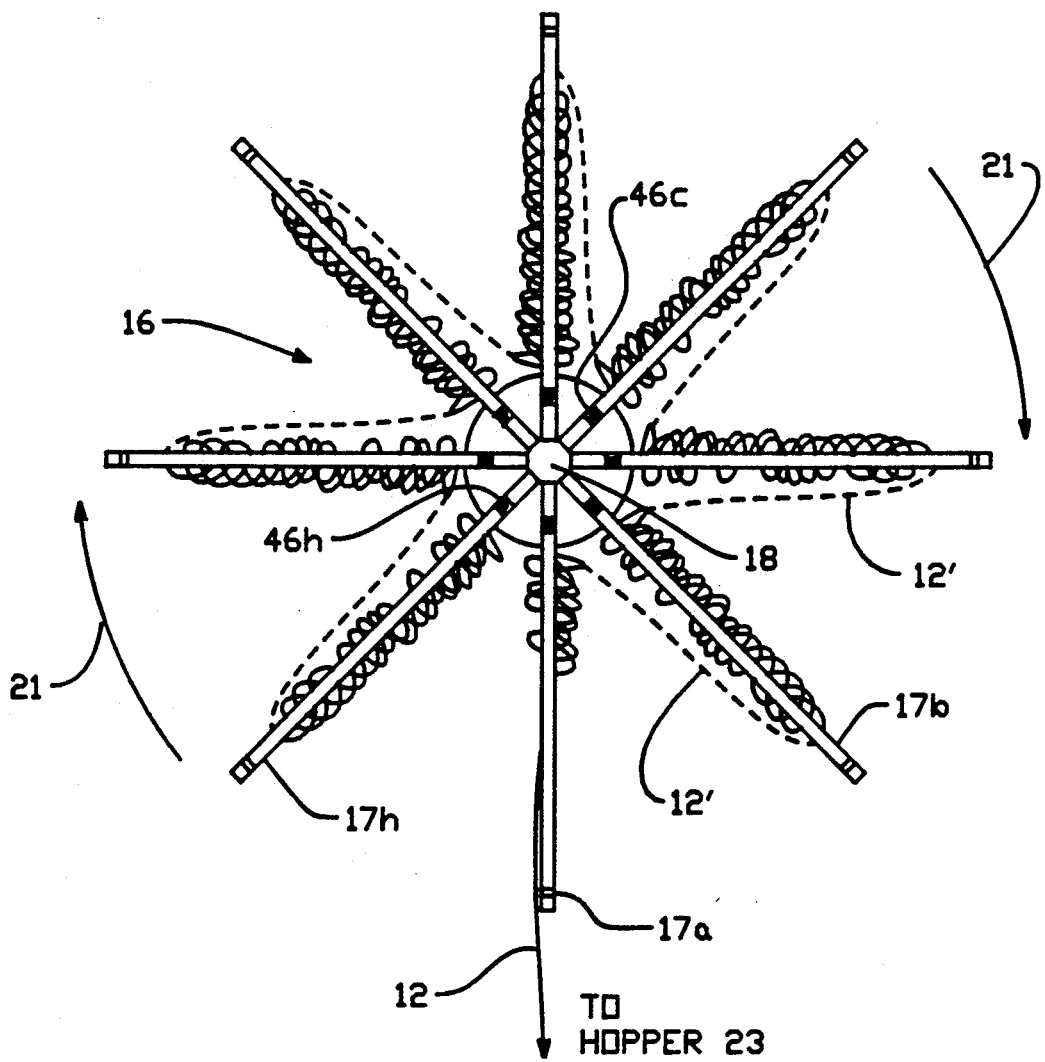
FIG.—5

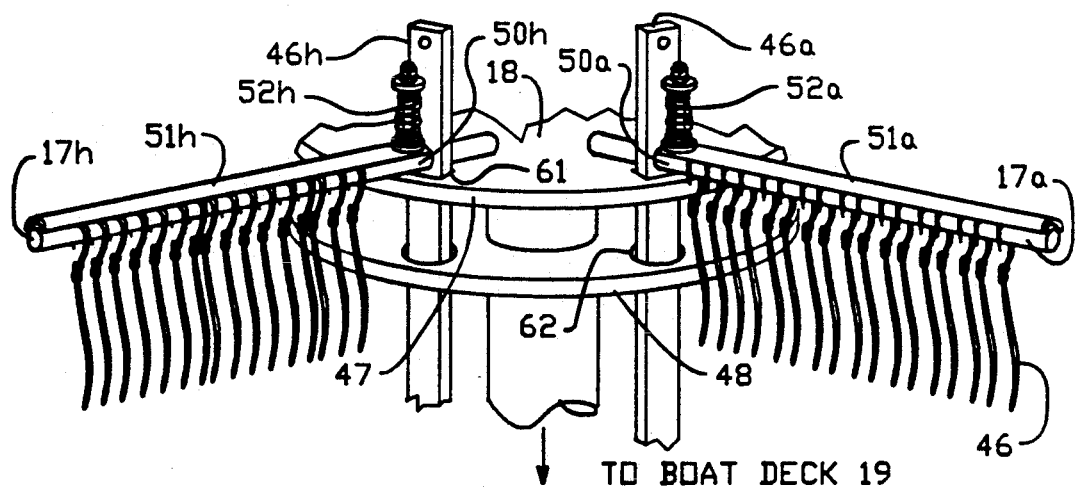
FIG.-6
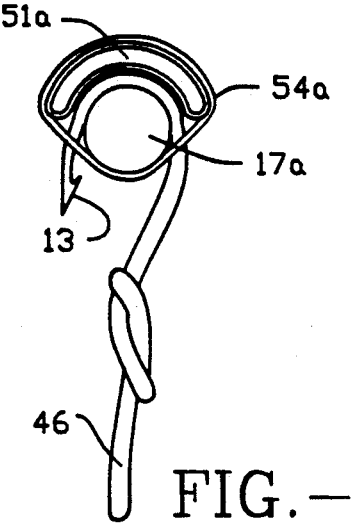
FIG.-7
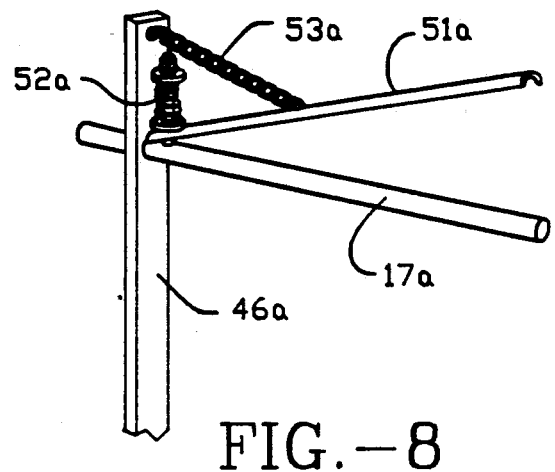
FIG.-8
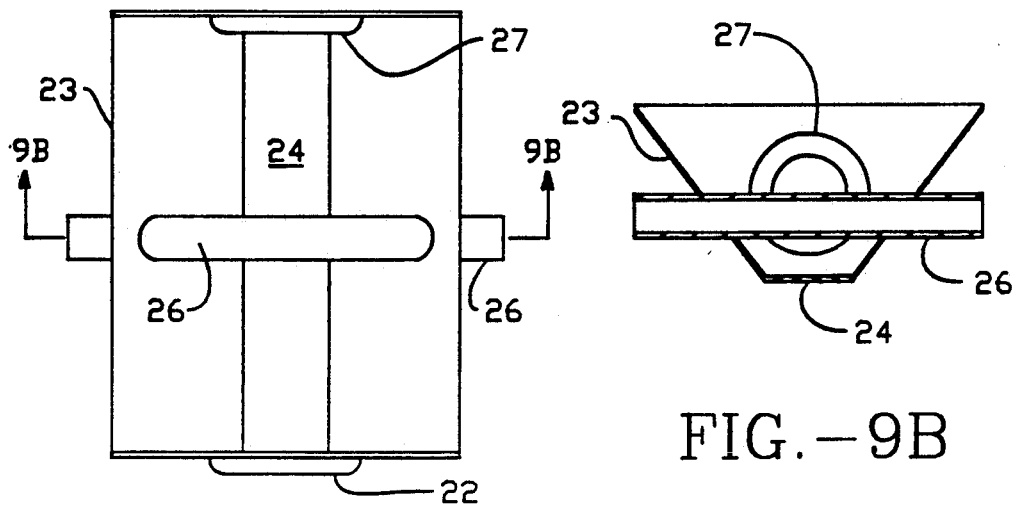
FIG.-9A
FIG.-9B

FISH LINE HOLDER AND BAITING APPARATUS AND PROCESS THEREFOR

The present invention is directed to a fish line holder and baiting apparatus and process therefor and more specifically to an apparatus for "long line" commercial fishing on the ocean where a single long fishing line having thousands of baited hooks is anchored to the ocean floor and trolled out behind the fishing boat in the baiting process and set with a second anchor and buoy to fish until retrieved.

BACKGROUND OF THE INVENTION

Long fishing line methods are known, for example, in Huff U.S. Pat. No. 4,354,323, which utilizes multiple racks and where automatic baiting is attempted. Racks of course contain the hooks which are spaced on a common line and as the fishing boat is under way, the weight or buoy is thrown overboard and this creates a pulling force which starts the common line off the interconnected racks. With a system as above, there are problems with the storage of the line and hooks on a typical fishing boat, both with the initial storage of the hooks and then preventing entanglements as they are pulled off from their storage locations.

Secondly, the necessary automatic baiting of the line is very difficult because of the rapid speed with which the line is being pulled out in back of the boat; the result is that many of the hooks are not effectively baited.

OBJECT AND SUMMARY OF THE INVENTION

It is therefore a general object of the present invention to provide an improved fish line holder and baiting apparatus and process therefor.

In accordance with the above object, there is provided a process for reeling out from a fishing boat floating in a body of water, a plurality of baited fish hooks spaced on a common line and connected thereto by gangions comprising the steps of storing the hooks on a plurality of arms arranges as spokes radiating from a common hub. The hooks are succesively unloaded from each of the arms while dropping a weighted end of the common line in a body of water and trolling the boat. While loading the hooks, they are baited by passing them through a substantially horizontal bait filled trough and a substantially vertical bait filled trough connected to each other by a transition flow conduit for the bait. The common line passes around a fairlead in the transition flow conduit.

BRIEF DESCRIPTION OF DRAWINGS

FIG. 4 is a plan view of the weighted end of a gangion line which is attached to the common fishing line.

FIG. 5 is an enlarged plan view in greater detail of the hook and line storage tree of FIG. 1.

FIG. 6 is a partial side view of FIG. 5 which is enlarged to show greater detail and is shown in perspective.

FIG. 7 is an end view in enlarged format showing the placement of a hook on an arm of FIG. 6.

FIG. 8 is a perspective view of a portion of FIG. 6 in alternative position.

FIG. 9A is a plan view of a lower bait hopper portion of FIGS. 1 and 2.

FIG. 9B is a simplified cross-sectional view taken along line 9B of FIG. 9A.

DETAILED DESCRIPTION OF PREFERRED EMBODIMENT

Figure 1:
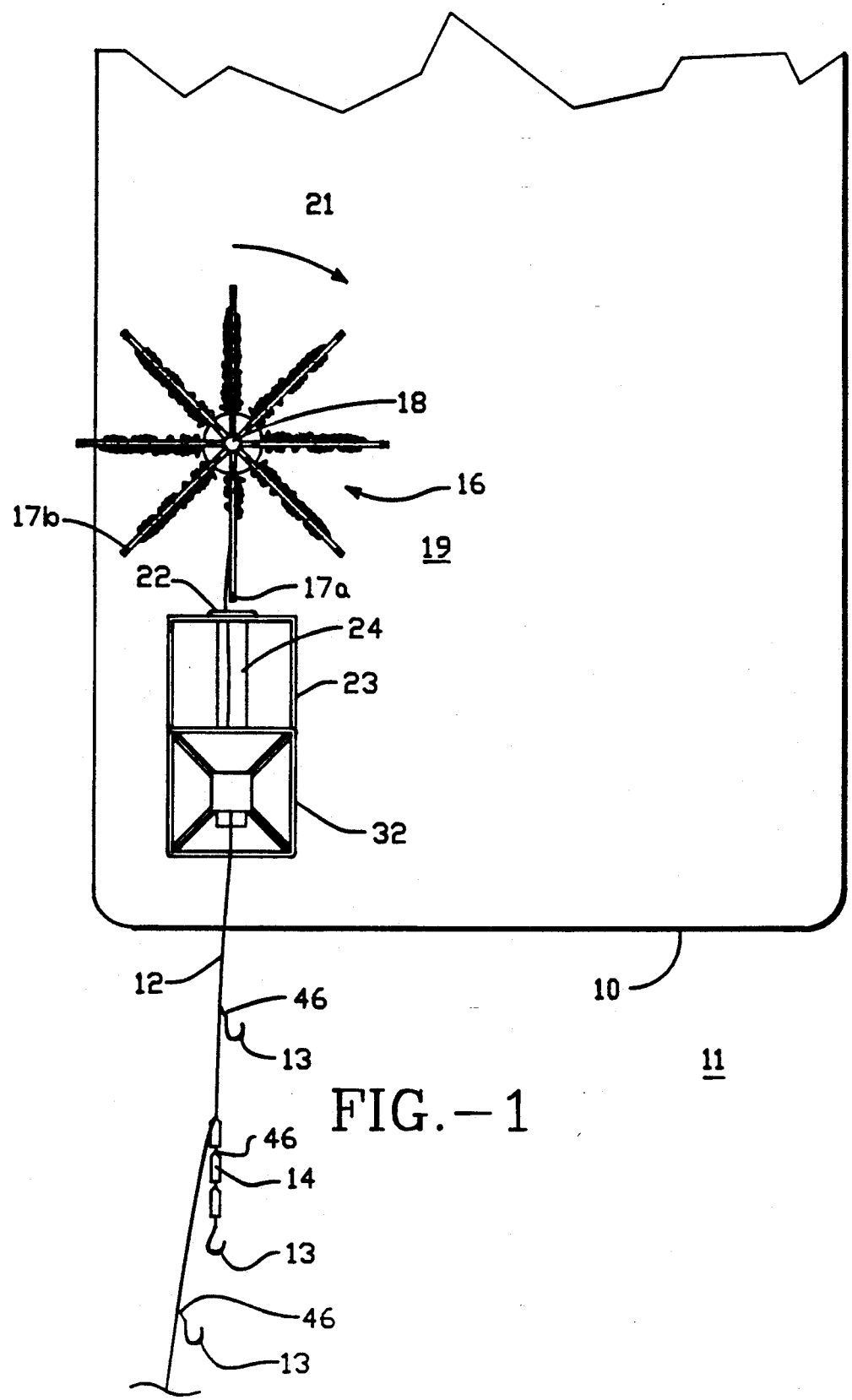
FIG. 1 is a plan view showing the apparatus of the present invention as it would be installed on the deck of a fishing boat.

FIG. 1 illustrates the aft end or rear of a fishing boat 10 floating in a body of water (such as the ocean 11). The side view of FIG. 2 should be referred to also. Extending out from the rear of the boat is a common line 12 having hooks, three of which 13 are illustrated but which in reality would in the long line of the present invention have thousands of such hooks. Such hooks are connected to common line 12 by gangions 46. A weight unit 14 is provided, only one of which is illustrated but several would be included; typically, one and a half pounds of weight is necessary for each 150 hooks. The use of several permanently installed intermediate, spaced weight units 14 avoids costly "leaded" line and stopping the common line to attach weights; the present weights, as will be discussed below, are designed to flow through the baiting apparatus. The line along with unbaited hooks is stored in a hook line storage tree and distribution unit 16 which as better shown in FIG. 1 includes 8 arms 17a through 17f which radiate from a central hub 18 which is mounted for rotation on deck 19 in the direction shown by arrow 21. The arms therefore are arranged as spokes which radiate from hub 18. As illustrated, each of the arms will overhang the edge of deck 19 when rotated.

Figure 2:
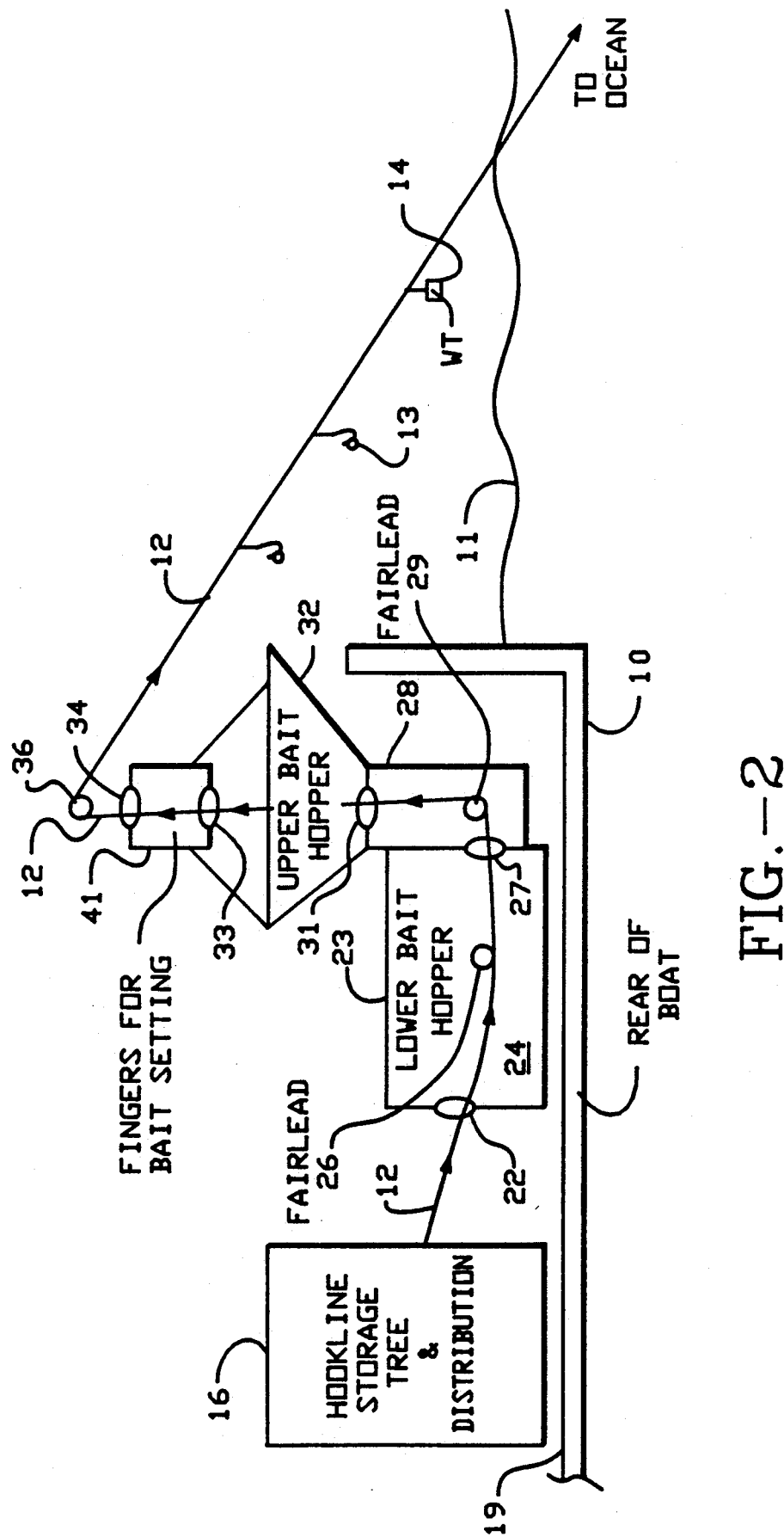
FIG. 2 is a diagrammatic side view of FIG. 1.

Still referring to both FIG. 1 and 2, after the line with unbaited hooks is unloaded from, for example, arm 17a which is aligned with substantially the center of a 360° fairlead 22. The line enters a lower bait hopper or trough 23. As best shown in FIG. 1, it has a V-shaped cross section but is truncated at the apex, as shown at 24, to form a channel which allows the bait slurry to be concentrated and better attached to the hooks on line 12.

Immediately inside the 360° fairlead entry point 22, is a cylindrical type fairlead 26 which keeps the line, hooks and weights low in the hopper channel 24 as they pass its length. At the exit of lower bait hopper 23 is another 360° fairlead 27 which serves to center the line 12, some of the hooks which have been baited and the weights as they enter a transition flow conduit 28. Since the common line 12 must make a substantially 90 turn here, there is a cylindrical fairlead 29 in conduit 28 which allows the line 12 to exit the transition conduit through a 360° fairlead 31 and go through the substantially vertical bait filled hopper or trough 32. Finally the line 12 extends through at least two more centering 360° fairleads 33 and 34 which are of course set above the level of the slurry level in the upper bait hopper 32 and then passes around a fairlead 36 to turn at an acute angle and go into the ocean as illustrated. Both upper bait hopper 32 and lower bait hopper 23 are filled with bait, for example, by bucket, which may be two inch cubes of squid.

Due to the pressure of the bait slurry in the upper bait hopper 31 pushing downward through the transition conduit 28 against the pressure of the bait in the lower bait hopper 23, and the hooks attached to the line 12 moving upward and counter to the bait pressure, most of the bait is set by the time the hooks exit the vertical transition flow conduit 28.

Figure 3:
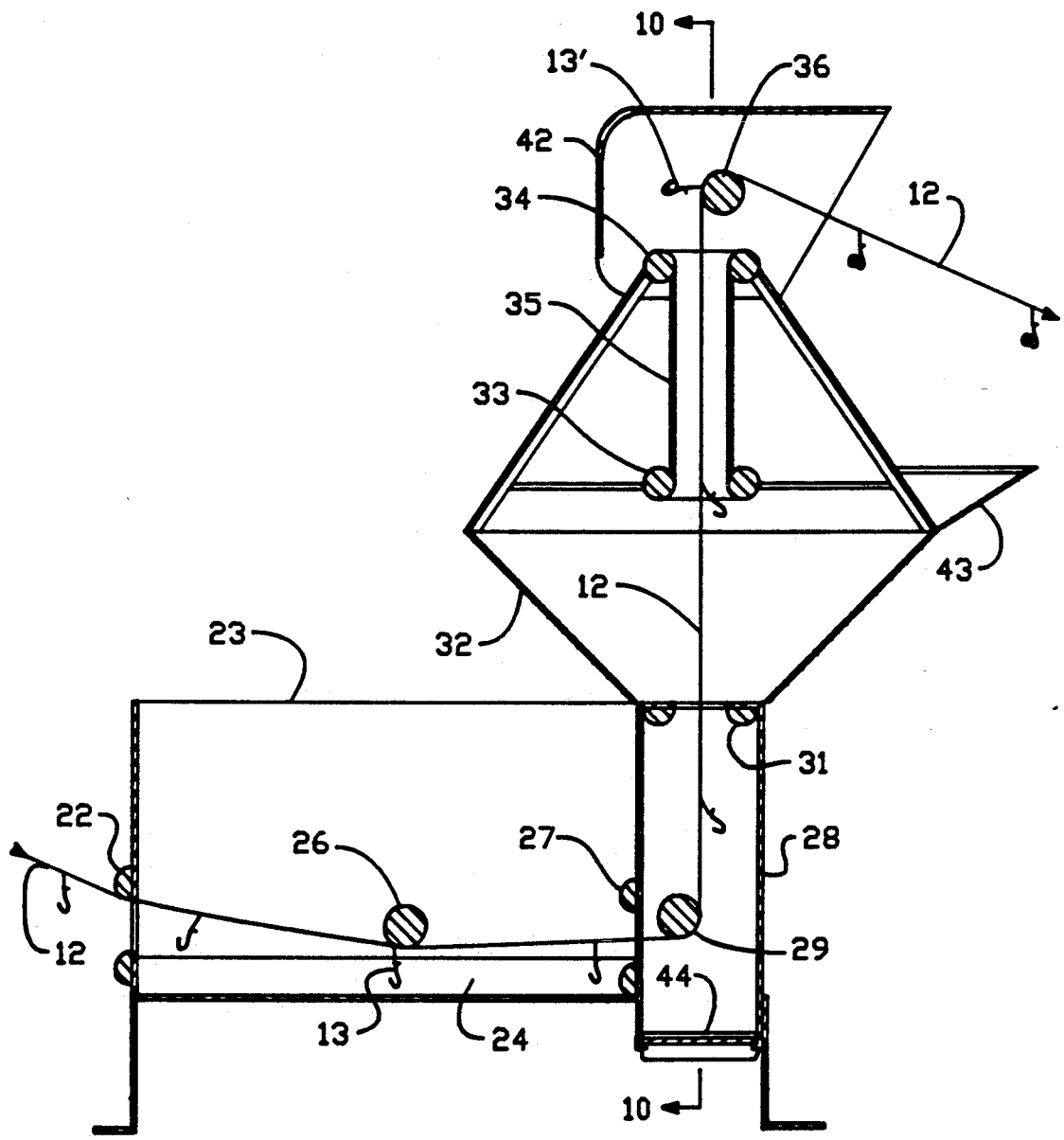
FIG. 3 is a cross-sectional view of portions of the apparatus of FIG. 2 showing the path of a fishing line.

FIG. 3 shows the lower bait and upper bait hoppers 23 and 32 and the vertical transition chamber 28 in greater detail. Here as the line 12 enters through the 360° fairlead 22, the cylindrical fairlead 26 insures that the line is close to the bottom of the trough or the channel portion 24 in order that the hooks 13 attach sufficient bait. Then the fairlead 29 in vertical conduit 28 is located so that the line is centered in the 360° fairlead 27. This centering is aided by the hourglass shape of fairlead 29 shown in FIG. 10. And at the same time fairlead 29 is located so that the line 12 is centered on the 360° exit fairlead 31, and also on the remaining fairleads 33 and 34. Fairleads 33 and 34 are connected by tube 35. Thus with the three bait chambers, the lower hopper 23, the upper hopper 32 and the vertical transition conduit 28, with the bait used, these by themselves successfully set the great majority of bait. Therefore fingers or brushes are not necessary as used in prior apparatus.

Continuing the discussion of FIG. 3, since the line 12 is moving at a relatively high speed, a centrifugal force is created around the cylindrical fairlead 36. This is illustrated by the baited hook 13' swinging out. Thus a hood or shield 42 is provided to keep centrifugal forces from throwing the bait off the hooks as they pass around this fairlead. And if this does happen there is an apron 43 extending out under the line 12 which is a part of the upper bait hopper 32. In addition to hood 42 preventing the hooks from casting off their bait due to the high centrifugal force, the hood 42 also provides for safety in separating the hooks at this point from personnel on the deck of the boat. And with apron 43 catching any bait that does fall off the hooks, this is fed back and reused in the upper bait hopper 32. This reduces waste and cleaning time.

Figure 10:
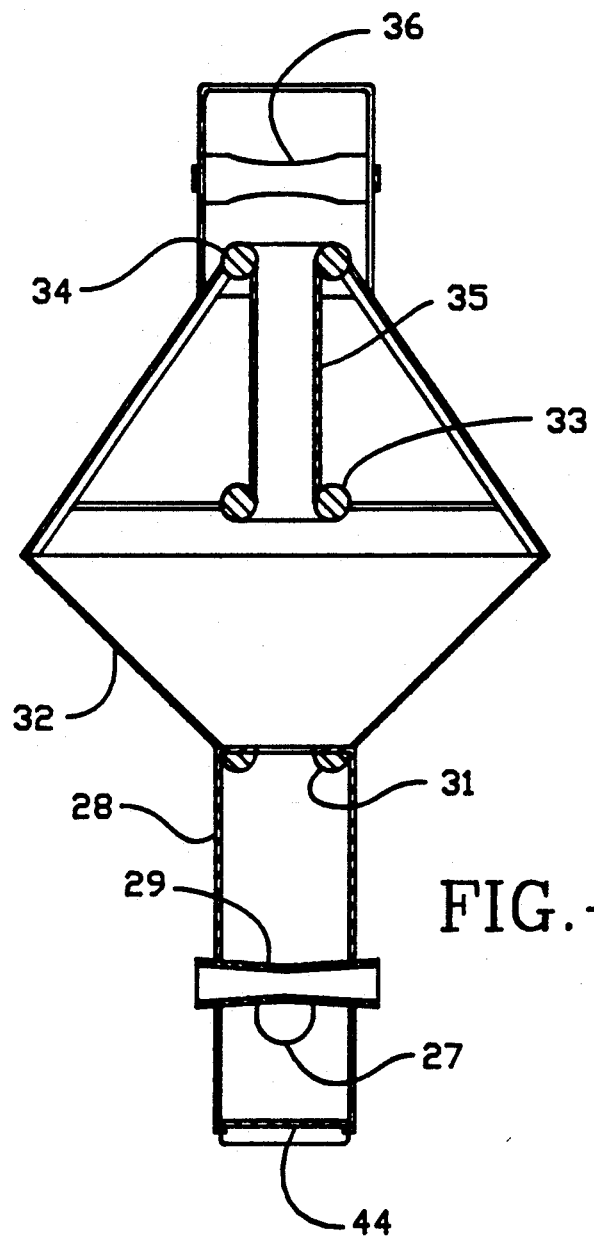
FIG. 10 is a simplified cross-sectional view taken along the line 10—10 of FIG. 3.

Vertical conduit 28 also includes a trap door 44 at its bottom to be used for cleaning purposes. This door is also shown in FIG. 10 and referring specifically to that FIGURE, this illustrates how the cylindrical fairlead 29 is centered on the 360° fairlead 27 of the horizontal bait trough 23. It also illustrates the square shape of vertical conduit 28 which is believed ideal to enhance the baiting of hooks by holding more bait.

Finally referring to FIGS. 9A and 9B to complete the baiting portion of the invention, the placement of the cylindrical fairlead 26 to insure proper leading in of the line into the horizontal bait hopper 23 and the channel 24 is illustrated; that is the fairlead 26 is spaced so that the line along with its hooks is forced toward the bottom of the trough 24.

FIG. 4 illustrates a typical weight unit 14 which is placed on the gangion line 46 which connects each hook 13 to the common line 12. The weight is of a design to fit and feed through both horizontal and vertical baiting troughs so that no time is lost in stopping the baiting procedure to add weights periodically to the line. Moreover, because they are typically in three articulated segments 14a, 14b, and 14c with a relatively small diameter of ¾ inch and 2 inches long in length, they will easily bend around the cylindrical fairleads 6, 29 and 36 and provide sufficient weight (for example, one and one-half pounds for each unit) for the long line, as expressed above. It is necessary to have approximately one and one-half pounds of weight for each 150 hooks. Thus the articulated nature of the weights provides for easy passage through the baiting unit. FIG. 5 better illustrates the fish line holder or carousel 16 along with the perspective side view of FIG. 6. Each of the arms 17a through 17h is removably fastened to hub 18 by means of the vertical support units 46a through 46h which are fastened to discs 47 and 48 which are part of the cylindrical hub 18. There are apertures 50a-50h in the vertical supports 46 through which arms 17a-17h are fitted. Each rod 46 is anchored to hub 18 by sliding it through a square hole 61 in top plate 47 and a round hole 62 in bottom plate 48. The round hole makes it easier to lift the square rod 46. This means that an arm 17 that has had its fish hooks unloaded can easily be removed by lifting up the associated rod 46 and replacing it with an arm loaded with hooks. The first part of the new line is then attached to the trailing end of the line ahead of it.

Hub 18 is rotatable in the direction as shown by the arrows 21 and its rotation is resisted by any simple friction brake at the deck level (not shown). The common line 12 is actually a single continuous line connecting all of the arms 17a through 17h by means of a connection of the inner portion of the line near the hub 18 to the next adjacent arm indicated by the dashed lines 12'. Thus it is clear that as one arm full of hooks is run through the baiting unit, since the last portion of the line on the arm is secured to the first part of the line on the next full arm, when this line is pulled into the bait hoppers, the next arm will turn to align it directly in the center or middle of the first 360° fairlead 22 as best shown in FIG. 1. Thus this provides for a very efficient unloading of carousel 16 and avoiding entanglements and obstructions.

Referring now to FIGS. 6, 7 and 8, the mounting of the various hooks 13 on the arms 17 is illustrated. Each set of, for example, 150 hooks 13 held on the stainless steel arms 17a-17h, are hooked over these arms which have a diameter that is substantially equal to the inner diameter of the hook 13 as illustrated in FIG. 7. This keeps the hooks from twisting and overlapping the hook next to it. Additionally the hooks on each of the arms are retained on the arms by the associated caps 51a through 51h. These curved caps as shown in very specific detail in FIG. 7 which closely follow the contour of hook 13. Each cap is spring biased by an associated spring 52a-52h against its associated arm 17 to generally retain the hooks on the various arms. To allow the hooks to be placed on the arms, the spring loaded caps 51 are held off of the arm by the associated chains 53a-53h.

To prevent the hooks from being pulled off the end of each of the arms accidentally, there is also provided as illustrated in FIG. 7, heavy rubber bands 54a-54h. This firmly secures the associated cap 51 against the arm. Once the main anchor weight at the end of the line which takes the line and hooks to the bottom is thrown overboard, the line feeding into the bait hoppers easily pulls this band 54 free. But most importantly, the retention means 54, and referring to FIG. 5 now, still allows the line 12 after one arm is unloaded to pull and rotate the next adjacent arm to center it, see FIG. 1, with the 360° fairlead 22. Thus the retention strip 54 is strong enough to allow this rotation to occur before releasing.

Another feature of the carousel unit 16 as best illustrated in FIGS. 6 and 7 is that the cap 51 is of a very limited curvature of approximately less than 90° so that as shown, both sides of the hooks can be seen to insure there are no overlaps or tangles. Each of the hooks 13 is of course connected to the common line 12 by a suitable gangion 46. Such gangions are short lengths of line that attach the hook at regular intervals to the common or set line 12.

In summary the present invention by the use of the three bait chambers, the horizontal bait hopper 23, the vertical hopper 32 and the transition conduit 28, provides for rapid and efficient baiting of thousands of hooks being run through these chambers at a high speed. At the same time, in order to provide this line capacity, the carousel type storage tree with its radiating spokes lessens entanglements and at the same time allows the hooks to be off loaded quickly. Thus an improved fish line holder and baiting apparatus and process therefor has been provided.

What is claimed is:

1. A fish line holder for use on the deck of a fishing boat in a body of water comprising: a plurality of arms arranged as spokes radiating from a central hub;
    each of said arms including means for handing a plurality of fish hooks thereon, all of said fish hooks being spaced on a common line and connected thereto by gangions and all of said plurality of hooks being successively unloaded from each arm by pulling on said common line;
    a vertical post for rotatably carrying said central hub at one end and adapted for mounting at its other end to the deck of said fishing boat.

2. A fish line holder as in claim 1 wherein said deck has an edge adjacent to said body of water and said vertical post is mounted to said deck at its edge so that at least one of said arms overhangs said body of water.

3. A fish line holder as in claim 1 including caps for retaining said hooks on each of said arms but allowing a portion of said hooks to be visible to insure proper alignment and non-entanglement.

4. A fish line holder as in claim 3 where said arms have a diameter substantially equal to the inner diameter of said hook.

5. A fish line holder as in claim 3 where each of said caps includes spring means for biasing such caps against said arms.

6. A fish line holder as in claim 1 including flexible retention means at the end of each of said arms for fastening said caps against said arms and retaining said hooks on said arms and to allow said arms to be rotated to an unload position by pulling on said common line.

7. A fish line holder as in claim 1 including means for allowing unloaded arms to be replaced with arms loaded with fish hooks.

8. A fish line holder as in claim 1 where said common line extends from the inner portion of each arm near said hub to the end of the next adjacent arm to form a continuous line connecting all of said arms.

9. Fish hook baiting apparatus for fish hooks spaced on and connected to a common line by gangions comprising a horizontal bait slurry containing trough and a vertical bait slurry containing trough, having at least a portion higher than said horizontal trough, a bait transition flow conduit means for connecting said vertical trough to said horizontal trough, said transition flow conduit means including a fairlead for changing the direction of the common line with attached hooks going through said conduit from substantially the horizontal bait slurry containing trough to the vertical bait slurry containing trough, said horizontal trough providing a slurry level a first distance above said fairlead and said vertical trough and said higher portion providing a slurry level a second distance above said fairlead, higher than said slurry level in said horizontal trough which produces pressure in said transition flow conduit means and horizontal trough to aid baiting of said hooks.

10. Fish hook baiting apparatus as in claim 9 where the horizontal trough includes a second fairlead for centering said common line in said transition flow conduit means and said horizontal trough as said line enters such trough.

11. Fish hook baiting apparatus as in claim 10 including a third fairlead for redirecting the motion of said common line from said vertical trough, and including shield means to prevent centrifugal forces from throwing the bait off the hook as it passes around such fairlead.

12. A fish hook baiting apparatus as in claim 10 including a rotatable carousel having a plurality of arms radiating from a central hub, each of said arms including means for hanging said hooks thereon, the center of rotation of such carousel being aligned with said second fairlead.

13. Fish hook baiting apparatus as in claim 9 including a common line with hooks spaced on and connected to said line by gangions where said gangions include a plurality of weights which are articulated and narrow to pass through said conduit means.

14. Fish hook baiting apparatus as in claim 9 including an apron at said upper vertical bait trough to catch unhooked bait.

15. Fish hook baiting apparatus as in claim 9 where said horizontal bait trough has a cross-section which is V-shaped but truncated at the apex to allow pressure of bait slurry to be concentrated.

16. A process for reeling out from a fishing boat floating in a body of water, a plurality of baited fish hooks spaced on a common line and connected thereto by gangions, comprising the steps of:
    storing said hooks on a plurality of arms arranged as spokes radiating from a central hub;
    unloading all of said hooks successively from each of said arms while dropping a weighted end of said common line in said body of water and trolling said boat;
    while unloading said hooks, baiting such hooks by passing them through a substantially horizontal bait-filled through and a substantially vertical bait-filled through connected to each other by a transition flow conduit for said bait, said common line passing around a fiarlead in said transition flow conduit.

17. A process as in claim 16 where said common line is passed around another fairlead between said vertical trough and said body of water but is shielded at such fairlead to prevent centrifugal forces from throwing bait off the hooks as they pass around such another fairlead.

18. A process as in claim 16 including the step of rotating said hub and arms after an arm is unloaded by pulling on said common line.

* * * * *